(12) United States Patent
Ravey

(10) Patent No.: US 8,715,809 B2
(45) Date of Patent: May 6, 2014

(54) COMPOSITE STRUCTURE

(75) Inventor: Eric P Ravey, Diseworth (GB)

(73) Assignee: Rolls-Royce PLC, London (GB)

( * ) Notice: Subject to any disclaimer, the term of this patent is extended or adjusted under 35 U.S.C. 154(b) by 444 days.

(21) Appl. No.: 12/071,253

(22) Filed: Feb. 19, 2008

(65) Prior Publication Data

US 2008/0220207 A1  Sep. 11, 2008

(30) Foreign Application Priority Data

Mar. 6, 2007 (GB) .................................. 0704254.2

(51) Int. Cl.
*B32B 7/00* (2006.01)

(52) U.S. Cl.
USPC .............. 428/137; 428/98; 428/102; 428/119

(58) Field of Classification Search
USPC .................... 428/137, 119, 98, 102
See application file for complete search history.

(56) References Cited

U.S. PATENT DOCUMENTS

| | | | |
|---|---|---|---|
| 4,113,910 A | 9/1978 | Loyd | |
| 4,559,005 A | 12/1985 | Gants et al. | |
| 4,992,317 A * | 2/1991 | Chess et al. | 428/102 |
| 5,725,709 A * | 3/1998 | Jensen | 156/169 |
| 5,789,061 A | 8/1998 | Campbell et al. | |

FOREIGN PATENT DOCUMENTS

| | | |
|---|---|---|
| FR | 2 440 831 A1 | 11/1978 |
| GB | 1 238 810 A | 7/1971 |
| JP | A 07-156888 | 6/1995 |

* cited by examiner

*Primary Examiner* — Brent O'Hern
(74) *Attorney, Agent, or Firm* — Oliff PLC

(57) ABSTRACT

A composite has a laminar core assembly defining a bend, the bend having a radially inner surface defining a fillet. A reinforcement block adjacent to the radially inner surface of the bend has sufficient thickness to at least partly bury the fillet. The reinforcement block reduces the through-thickness tensile stress in the laminar core assembly and thereby reduces the risk of delamination.

18 Claims, 3 Drawing Sheets

COMPOSITE STRUCTURE

BACKGROUND

The present invention relates to composite structures and more particularly to composite structures of an organic matrix composite (OMC) type utilised to form components such as vanes and other elements within gas turbine engines.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

In view of the above it will be appreciated that gas turbine engines operate at relatively high temperatures and provide stressing and loads which vary both cyclically as well as in terms of intensity during an operational cycle. Gas turbine engines utilised for aircraft propulsion have an ongoing objective of weight reduction. In such circumstances use of composite materials which allow a reduction in weight are advantageous.

Composite materials have been utilised in gas turbine engines and other situations previously. With regard to gas turbine engines achievement of acceptable safety criteria and component life, at least relative to traditional components to provide the same function, are clear requirements.

Composite structures generally comprise a laminar core which is assembled either as a single laminar core ply of materials appropriately shaped or more typically laminar core assemblies comprising a number of laminar cores appropriately arranged and conformed together to provide a conjunction as a joint within a component. To be acceptable a laminar core assembly, as indicated, should meet desired criteria and in particular thickness strength in such areas as vane fillets in the laminar core assembly. Nevertheless, these components may be subject to a range of loadings in particular impacts which must be considered.

SUMMARY

Aspects of exemplary embodiments particularly relate to composite structures incorporating fillets where out of plane stress gradients can be significant in tension or where a peak in plane tensile stress must be reduced in a specific area or moved away from that area.

In accordance with the exemplary embodiments there is provided a composite structure and a method of forming a composite structure as set out in the claims.

BRIEF DESCRIPTION OF THE DRAWINGS

Embodiments will now be described by way of example and with reference to the accompanying drawings in which:—

Figure 1:
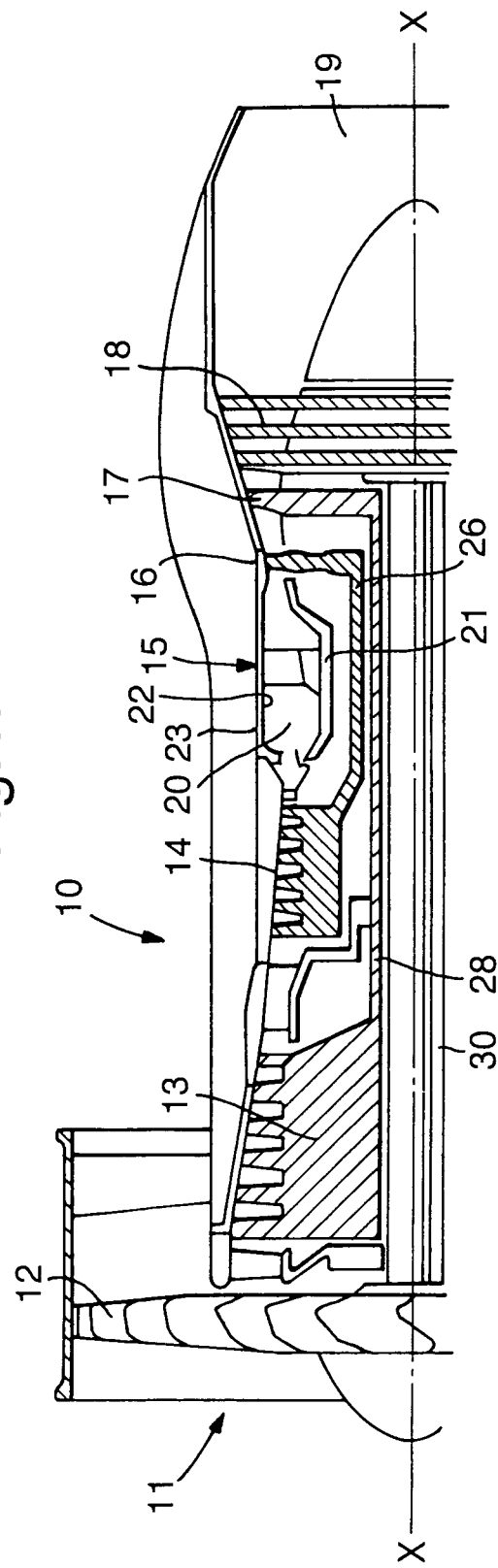
FIG. 1 is a sectional side view of part of a gas turbine engine of known type.

As indicated above, use of composite structures in order to provide benefits with regard to weight as well as strength within such machines as gas turbine engines has advantages. However, the nature of composite structures comprising laminar cores results in potential problems in relation to loading. For example, with regard to static vanes in gas turbine engines already subject to dynamic pressures and engine temperatures there may be additional vibration and surge factors which can result in premature failure of the component. Generally, composite structures are found to be significantly stronger in compression than in tension. Thus, with respect to the inherent operational variations in a machine such as a gas turbine engine, component life can be limited as a result of thickness tensile stress rather than thickness compressive stress.

It will be understood any composite structure will typically incorporate bends and curves which define fillets. These fillets under loads will display bending behaviour where one side will be in tension and the other side in compression. Furthermore, with respect to double curvature fillets, it will be understood that this bending effect will be different at the leading and trailing edges when compared to a mid point within the vane fillet, that is to say in the laminar core. The peak thickness tensile stress can reach an unacceptable level under extreme conditions such as a result of a number of surge loadings in a gas turbine engine. Such peak tensile stresses can increase in service failure of the composite component, limit component life and create unacceptably short inspection and maintenance intervals.

In accordance with the exemplary embodiments additional reinforcement blocks are located close to the fillet formed by bends or curves in a composite structure. These reinforcement blocks will reduce directly in plane tensile stress and through thickness tensile stress and so tend to increase component life.

Delamination in composite structures may occur from inter planar stresses generally coming from out of plane loading events such as impact or surge or from discontinuities in the materials from which the laminar cores are formed or their geometry. As indicated above, normal or extreme gas loads on an aerofoil component as an example of a composite structure in accordance with aspects of the exemplary embodiments may create bending loads. With regard to such an aerofoil in the form of vanes particular care is taken with regard to delamination such as ply drop offs, edges, discontinuities, gap filler extremities and aerofoil to platform fillets. Aerofoil to platform fillets are of particular concern with respect to aspects of the exemplary embodiments. Component life, as indicated, can be significantly curtailed or limited if excessive through thickness stress exists in tension causing delamination about the aerofoil to platform fillet. In accordance with the exemplary embodiments through thickness strength can be improved indirectly by arranging extra plies of material in selected areas where high inner laminar stress occurs.

DETAILED DESCRIPTION OF EMBODIMENTS

Figure 2:
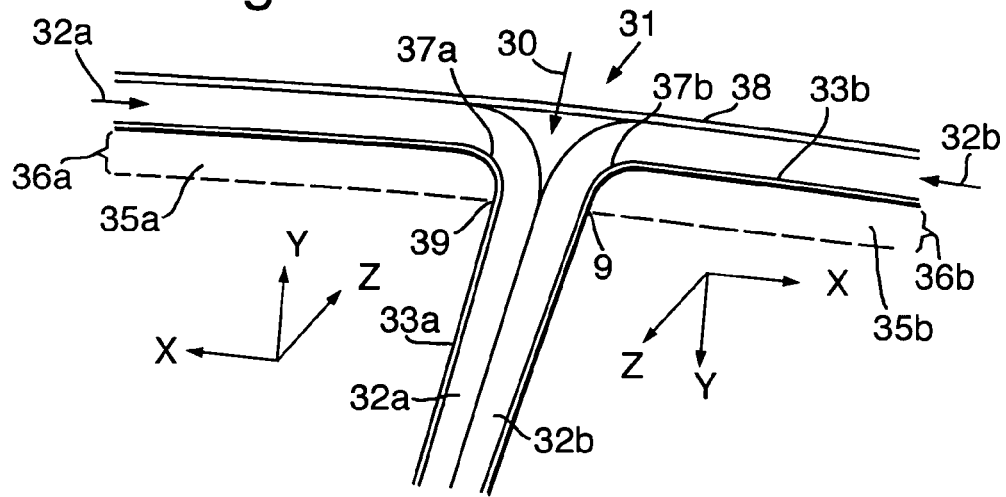
FIG. 2 is a schematic side view of a composite structure in accordance with one embodiment of the present invention.

FIG. 2 provides a schematic illustration of an aerofoil to platform fillet in a composite structure 31. The structure 31 under bending loads will give on the tension side the following stress distribution. The stress distribution will be zero through the thickness stress on the fillet surface and peak through thickness tensile stress into the middle of the laminar core. It will also be understood that there is peak in plane tensile stress at the fillet surface and zero in plane stress towards the middle of the laminar core.

As FIG. 2 shows improvement in composite structure strength about the fillet can be provided by provision of block reinforcement 35 along one side of the laminar core 32. The reinforcement block 35 typically has a depth 36 such that the reinforcement block 35 extends across an apex or run out curve 37 of a bend in the laminar core 32.

As can be seen, FIG. 2 depicts a T junction configuration in which two laminar cores 32a, 32b are provided in an assembly. The cores 32a, 32b are substantially symmetrical in terms of thickness and bend in the structure 31 but it will be understood in some circumstances the cores 32a, 32b may be asymmetric in terms of core thickness or angle of presentation. In such circumstances the respective reinforcing blocks 35a, 35b will be adjusted in order to provide a depth 36 to suit reinforcement of the fillet created by the apex or run out curve 37 respectively. As can be seen, the cores 32a, 32b mate in order to provide the composite structure as a component. Typically, the structure 31 incorporates wrap surfaces 33a, 33b on one side and a further wrap surface or platform ply 38 on the other side in order to provide surface protection for the structure in use. It will be appreciated that the wraps 33a, 33b and further wrap surface 38 on both sides of the cores 32 together define effectively an aerofoil in a gas turbine vane embodiment of the present invention. A space 30 between the cores 32a, 32b and the platform ply 38 is filled with an appropriate material.

As indicated above, under loading it will be appreciated that respective sides of the structure 31 will be in compression downstream and tension upstream at the conjunction between the cores 32a, 32b as depicted in FIG. 1. Thus, as can be seen, the respective distortion of the structure 31 in the direction of axes X, Y, Z will be opposite each other across the conjunction between the cores 32a, 32b. These differences in loading cause delaminating as indicated above. By provision of the reinforcement blocks 35a, 35b greater strength is provided in the through depth of the structure 31.

FIG. 2 provides a schematic illustration where the cores 32a, 32b and wraps 33a, 33b act as a laminar on each side of the component structure 31 and in particular the fillet provided by the apex or curve of bend 37. It will be understood that the cores 32a, 32b of the structure 31 can define a curvature or bend 37 generally in the range up to 90° with reinforcement provided by the blocks 35a, 35b but also this reinforcement may be provided appropriately in curvatures and bends in other planes to that depicted in FIG. 1.

It will be noted that the reinforcing blocks 35a, 35b substantially match and flesh towards the fillet defined by the respective bends 37a, 37b. In short, the reinforcing blocks 35a, 35b effectively "bury" completely or partly the fillet provided by the bends 37a, 37b such that it cannot be seen in a preferred embodiment. However, for reduced reinforcement such that some flexibility can be provided, it will be understood that the thickness 36a, 36b of the blocks 35a, 35b may be such that the blocks 35a, 35b do not extend completely across and through the run out of the bends 37a, 37b. It will be understood that providing blocks with a thickness 36a, 36b which extend substantially beyond the run out range of the bends 37a, 37b will generally add to weight with possibly little greater reinforcement effect. By the blocks 35a, 35b pressing against the full range of the bends 37a, 37b it will be understood that there is maximisation of packing benefits with minimisation of a number of singularities into the fillet whilst providing a sharp optimal corner 39 for aero dynamic purposes.

As shown in FIG. 2, the cores 32a, 32b define a radially inner surfaces and the blocks 35a, 35b extend only partially along the radially inner surfaces of the cores 32a, 32b. The radially inner surfaces of the cores 32a, 32b have a height that is different from the height of the blocks 35a, 35b.

In use it will be appreciated that typically to achieve good performance it is desirable to provide the maximum realistic fillet radius such that a high strength composite fillet in accordance with the present invention is provided by burying that fillet with reinforcing blocks 35a, 35b which extend, as indicated, ideally up to the run out position of the bend 37 in order to create the aero dynamic sharp corner 39. It will be appreciated that the cores 32a, 32b, as indicated, are combined in order to define between the wrap layers 33a, 33b a vane.

Generally, the reinforcing blocks 35a, 35b will be formed at the same time as the composite structure comprising the laminar cores 32a, 32b. The reinforcing blocks 35a, 35b between the fillets defined by the bends 37a, 37b will typically have a fibre reinforced nature and comprise a number of plies of material with fibres therein. The general direction or principal direction of the fibres within the blocks 35a, 35b will be towards the bend 37a, 37b, that is to say the fillets defined by the cores 32a, 32b and wraps 33a, 33b. Generally the reinforcing blocks 35a, 35b will be configured to reduce the in plane tensile stress at the fillet surface created by the bends 37a, 37b optimised at a mid core position. Alternatively, the reinforcing blocks 35a, 35b may be arranged to generate peak in plane compressive stress by compression of the fillets at leading and trailing edges of the conjunction between the laminar cores 32a, 32b to define the vane. By this approach there is a reduction generally in the through thickness tensile stress in the middle of the laminar cores forming the composite structure.

It will be appreciated by the addition of the reinforcing blocks 35a, 35b typically in the form of plies composite structures are arranged which have a shift in peak in plane stress and peak through thickness stress positions. Addition of the reinforcing blocks 35a, 35b will also alter the magnitude and the maximum in plane and through thickness tensile stresses to minimise risk of damage by delamination in the cores 32a, 32b.

It can be shown that through thickness stress can vary between 30% of the maximum in plane stress for fillet radius to thickness ratio in the order of 0.2 to less than 10% of the maximum in plane stress for fillet radius to thickness ratios of 2. In such circumstances, as indicated above, it is generally accepted that fillet radius should be maximised to drive the maximum through thickness down. In such circumstances the plies of the laminate core are then typically at 45° which reduces overall ratios of through thickness to in plane stress maxima.

FIG. 2 provides a schematic illustration where the cores 32 and wraps 33, 38 act as a laminar on each side of the component structure 1 and in particular the fillet provided by the apex or curve of bend 37. It will be understood that the cores 32 of the structure 31 can define a curvature or bend 37, having a radially inner surface and a radially outer surface, generally in the range up to 90° with reinforcement provided by the blocks 35 but also this reinforcement may be provided appropriately in curvatures and bends in other planes to that depicted in FIG. 1.

After optimising the fillet laminar radius applying reinforcing blocks 35a, 35b in the form of additional plies formed during the manufacturing process further reduces the ratio of through thickness to in plane stress maxima. It is possible to create negative ratios above all at leading edge or trailing edge positions due to the change in the peak in plane tensile stress into peak in plane compressive stress. The effect of such an approach may lead to less beneficial mid chord stressing relative to the leading edge or trailing edge. However, fillet laminar is generally thicker at the mid core positions relative to edge positions. It is edges which tend to be more critical than mid core positions in terms of delamination so that a positive beneficial effect with regard to edge surfaces of the laminar cores as generally an enhancement with regard to component life. Generally, the thickness and positioning of the reinforcing blocks 35a, 35b will be such as to achieve additional safety margins with respect to excessive corrosive stresses within the laminar to meet and provide confidence with respect to component use in such situations as gas turbine engines.

In comparison with a typical strength for a composite fillet, the present invention provides a more uniform support close to the composite fillet and a more aero dynamic corner to optimise engine performance in a gas turbine engine. Furthermore by positioning adequate reinforcing blocks in the composite fillets it is possible for a specifier with regard to the component to reduce peak in plane tensile stress or even change peak in plane stress from tension to compression at the fillet surface and act then on the through thickness tensile stress distribution to prevent any delamination growth and so extend component life.

As will be schematically described below it will be appreciated that reinforcing blocks adjacent to bend forming fillets in laminar component structures in accordance with the present invention may also be provided in other joint types such as L, U or Z shaped joints. Furthermore, rather than having two cores 32a, 32b as depicted in FIG. 2, it may be possible to provide a single core bent appropriately with reinforcement about the bend fillet utilising a reinforcing block in accordance with the present invention. Furthermore, in addition to bending loads it will be appreciated that composite structures in accordance with the present invention will also provide enhancement with regard to loads orthogonal to the structure.

It will be appreciated that composite structures in accordance with the present invention may be utilised in a wide range of applications. With regard to gas turbine engines these applications include stator vanes for compressor stages of the engine along with framing, casing and other components within an engine.

Typically, the reinforcing blocks, as indicated, will comprise plies of material associated with the composite structure during manufacture. Formation of composite structures is well known and a person skilled in the technology can form structures as defined in accordance with the present invention by provision of reinforcing blocks during the typical resin transfer moulding stages of manufacture of composite structures. Generally, the additional plies will simply be added to the mould as necessary to create the structures in accordance with the present invention.

Alternatively, it will be understood with regard to existing composite structures reinforcing blocks may be secured by an appropriate mechanism such as by an adhesive post formation of the composite structure. In such circumstances the reinforcing blocks can be added to achieve the desired through stress and in plane stress management. Furthermore, such reinforcement blocks may enhance existing composite structures to meet desired higher assurance levels with regard to performance and component life. Post secured reinforcing blocks may also be utilised as a repair before premature delaminating or de-grading of the composite structure.

Figure 3:
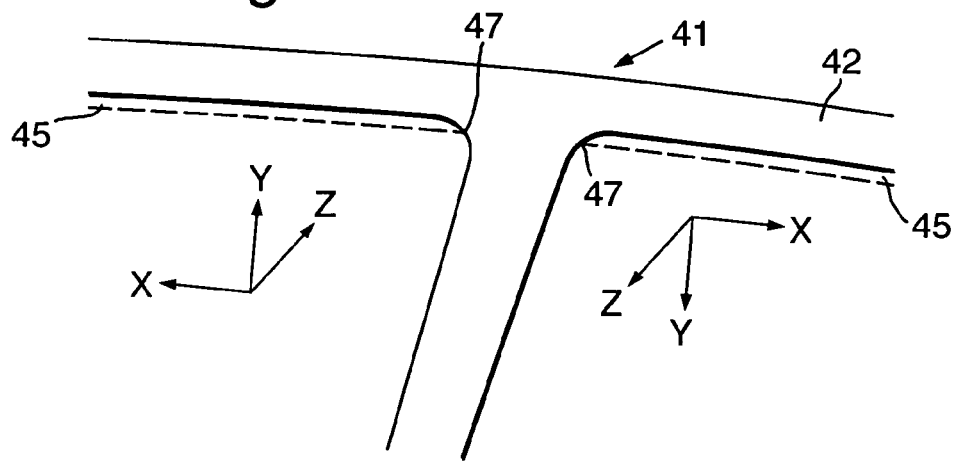
FIG. 3 is a schematic illustration of a first alternative embodiment of a composite structure in accordance with the present invention.

FIG. 3 schematically illustrates a first alternative composite structure in accordance with the present invention where the potential for extreme load stressing is not so great. In such circumstances, as can be seen, the structure 41 again comprises a laminate core 42 with fillets defined by bends 47. These bends 47 as fillets in the laminar core 42 are partially filled by reinforcing blocks 45 extending partially across the bend apex or curve 47 defining the fillets. In such circumstances some reinforcement in the direction of axes X, Y, Z is provided but of a lesser extent than the embodiment depicted in FIG. 2.

Figure 4:
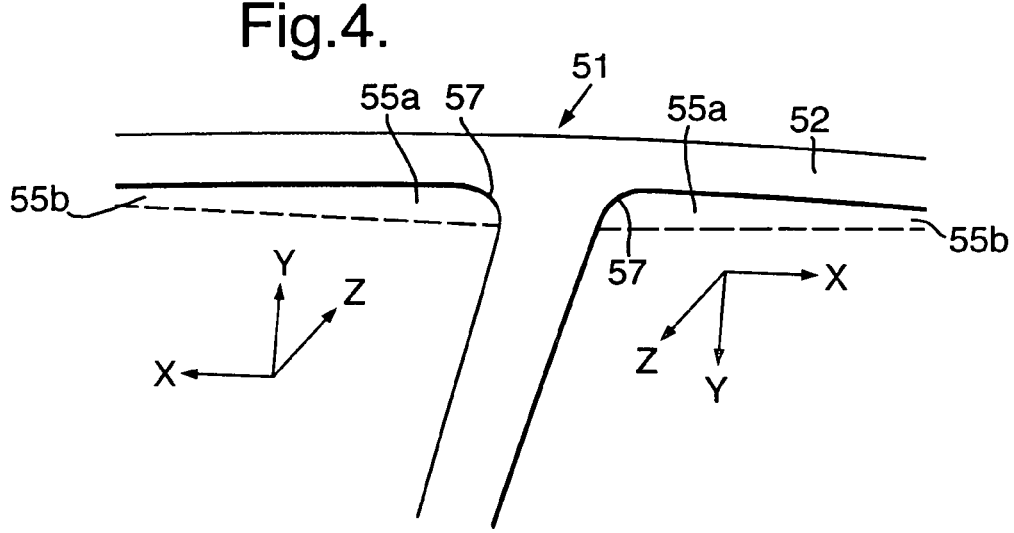
FIG. 4 is a second alternative configuration of a composite structure in accordance with the present invention; and, FIG. 5 is a schematic illustration of different composite structure conjunctions to define joints in accordance with the present invention.

FIG. 4 illustrates a second alternative embodiment of a composite structure 51 in accordance with the present invention. In this embodiment of a composite structure 51 it will be noted that reinforcing blocks 55a, 55b taper away from a fillet provided by bends 57 in a laminar core 52. In such circumstances it will be appreciated that reinforcement about the fillet by extending across the apex or curve 57 substantially to the end of a run out of that apex or curve 57 of the bend is provided. However, by tapering away such that the thickness of the reinforcing block 55a nearer to the fillet defined by the bend 57 is thicker in comparison with the reinforcing block 55b at displaced positions results in effective anchoring of the blocks 55 to the core 52 due to the extended length of association but with a reduced material volume and therefore weight whilst still presenting reinforcement at the most critical part, that is to say the fillet defined by the bend or apex 57. In short the reinforcing block in the form of an assembly of plies drops away at displaced positions from the fillet but still maximises the fillet entry by the reinforcing blocks 55a, 55b.

FIG. 5 provides schematic examples of alternative composite structures in accordance with the present invention other than the T joint conjunction of laminar cores as described above.

Figure 5A:
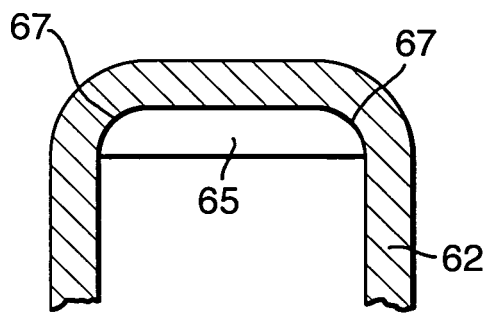

In FIG. 5a, a U joint composite structure is illustrated in which, as can be seen, a U shaped core 62 has a reinforcing block 65 located within it. This block 65, as can be seen extends across fillets defined by bends 67 in the core 62. In such circumstances reinforcement is provided in accordance with the present invention.

Figure 5B:
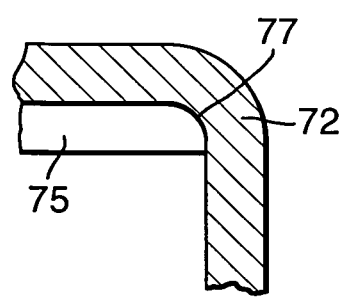

FIG. 5b illustrates an L shape joint. A laminar core 72 is arranged to define an L shaped corner with a reinforcing block 75 configured to engage a bend 77 as a fillet in the core 72. In such circumstances again reinforcement is provided by the reinforcing block in accordance with the present invention.

Figure 5C:
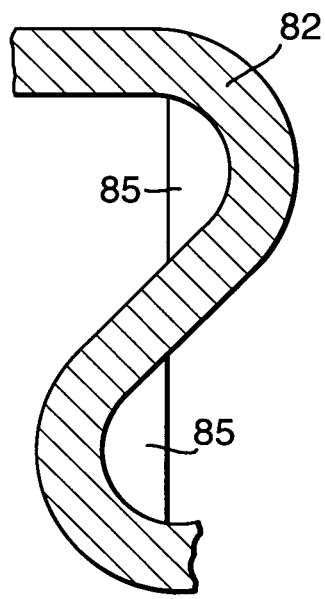

FIG. 5c illustrates a Z shaped joint. A laminar core assembly 82 defines a double S or Z bend shape with reinforcing blocks 85 in accordance with the present invention entering fillets or bends in the core 82 in order to provide reinforcement.

As indicated above, the present invention provides more uniform support close to composite fillets, which then act to provide sharper more aerodynamically acceptable corners for utilisation within a gas turbine engine. Appropriate positioning of the reinforcing blocks in the composite fillets enables specification of a reduction in peak in-plane stress possibly even altering peak in-plane stress from tension to compression at the fillet surface and therefore act to enhance component performance and life. As indicated above, generally laminar and composite structures act best in compression in comparison with tension and therefore translating a tension configuration into a compression configuration has particular advantages with regard to composite structures.

Modifications and alterations to aspects of the present invention will be understood by those skilled in the art. Thus, as indicated, composite structures although described principally in relation to components for gas turbine engines may be formed in accordance with the present invention for other uses such as in relation to housings and structural parts for other machines and static bodies. Generally, the plies of the reinforcing blocks, as indicated, will be associated with the composite structure during manufacture of that composite structure through a typical manufacturing process for forming composite structures such as resin transfer moulding.

I claim:

1. A composite vane structure comprising:
   an aerofoil;
   a platform ply;
   a laminar core assembly defining a bend between the aerofoil and the platform ply, the bend having a radially inner surface defining a fillet; and
   a reinforcement block abutting the radially inner surface, the block having a thickness, such that the block at least partly buries the fillet and the block extends only partially along the radially inner surface.

2. The structure as claimed in claim 1 wherein the laminar core assembly comprises a single laminar core bent to provide the bend.

3. The structure as claimed in claim 1 wherein the laminar core assembly comprises two laminar cores in conjunction to form a joint.

4. The structure as claimed in claim 3 wherein the joint is T shaped or L shaped or Z shaped or U shaped.

5. The structure as claimed in claim 1 wherein the laminar core assembly is covered with a wrap surface.

6. The structure as claimed in claim 5 wherein the laminar core assembly is covered with the wrap surface on both the radially inner surface and a radially outer surface of the bend defined by the laminar core assembly.

7. The structure as claimed in claim 1 wherein the bend has an angle up to 90°.

8. The structure as claimed in claim 1 wherein the block extends at least to an end of a run out curve of the bend in the core assembly.

9. The structure as claimed in claim 1 wherein the bend defines the fillet in the laminar core assembly.

10. The structure as claimed in claim 1 wherein the reinforcement block comprises a fibre reinforcement layer.

11. The structure as claimed in claim 10, wherein a principal direction is towards the bend.

12. The structure as claimed in claim 1 wherein the reinforcement block is arranged to hold the bend in compression.

13. The structure as claimed in claim 1 wherein the reinforcement block comprises plies of material.

14. The structure as claimed in claim 13 wherein the plies of material taper away from the bend.

15. The structure as claimed in claim 1 wherein the reinforcement block is an integral part of the laminar core assembly.

16. The gas turbine engine incorporating a composite structure in accordance with claim 1.

17. A method of forming a composite vane structure comprising:
   forming a laminar core assembly defining a bend between an aerofoil and a platform ply, the bend having a radially inner surface defining a fillet; and
   presenting a reinforcement block abutting the radially inner surface, the block having a thickness, such that the block at least partly buries the fillet, the block extending only partially along the radially inner surface.

18. The gas turbine engine incorporating a composite structure formed by a method as claimed in claim 17.

* * * * *